United States Patent [19]

Sakano et al.

[11] 4,296,216

[45] Oct. 20, 1981

[54] THERMOPLASTIC RESIN COMPOSITION

[75] Inventors: Hajime Sakano, Hirakata; Mikio Kodama, Takatsuki; Koichi Nakayama; Isao Yoshida, both of Amagasaki; Atsunori Inoue, Takatsuki, all of Japan

[73] Assignee: Sumitomo Naugatuck Co., Ltd., Osaka, Japan

[21] Appl. No.: 127,287

[22] Filed: Mar. 5, 1980

[51] Int. Cl.$^3$ .................. C08L 55/02; C08L 77/00; C08L 59/02; C08L 59/04

[52] U.S. Cl. .................................. 525/66; 525/64

[58] Field of Search ............................ 525/64, 66

[56] References Cited

U.S. PATENT DOCUMENTS

| | | | |
|---|---|---|---|
| 3,642,940 | 2/1972 | Burg | 525/64 |
| 3,749,755 | 7/1973 | Bronstert | 525/66 |
| 4,205,020 | 5/1980 | Hendy | 525/66 |
| 4,221,879 | 9/1980 | Humme | 525/66 |
| 4,250,271 | 2/1981 | Morris | 525/66 |

FOREIGN PATENT DOCUMENTS 990194   5/1965   United Kingdom ................ 525/66

*Primary Examiner*—Paul Lieberman
*Attorney, Agent, or Firm*—Lawrence Rosen

[57] ABSTRACT

A thermoplastic resin composition excellent in coating property which comprises (A) at least one of polyamide resins and polyacetal resins, (B) at least one of aromatic monovinyl compound/vinyl cyanide copolymers comprising units of aromatic monovinyl compounds and units of vinyl cyanides in a weight ratio of 60:40 to 80:20 and having an intrinsic viscosity of 0.3 to 1.1 and (C) at least one of conjugated diene rubber/vinyl cyanide graft copolymers comprising units of conjugated diene rubbers in an amount of 5 to 45% by weight based on the weight of the graft copolymers in a weight proportion of the components (A), (B) and (C) being 0.1–10: 5–90: 5–94.9.

1 Claim, No Drawings

THERMOPLASTIC RESIN COMPOSITION

The present invention relates to a thermoplastic resin composition excellent in coating property. More particularly, it relates to a thermoplastic resin composition which can afford a product having a good adhesion to a coating film provided thereon.

Conjugated diene rubber/aromatic vinyl compound/vinyl cyanide polymers (ABS resins) have excellent mechanical and molding properties and are employed in various fields. When, however, the molded products of ABS resins are used in the outdoors, the conjugated diene rubber components are apt to be deteriorated by ultraviolet rays. In order to prevent such deterioration, coating is usually applied onto their surfaces.

In general, ABS resins are excellent in adhesion with coating films provided thereon and have a good affinity to thinners. For manufacture of their molded products, an injection molding process is usually adopted, and as the results, residual stress remains depending on the molding conditions. Due to such residual stress, satisfactory coating can be hardly achieved, and stress cracks are frequently produced. Such stress cracks occur particularly around the gate to which a shearing stress is greatly applied on the injection molding.

As the result of an extensive study to prevent the production of unsatisfactory coating in ABS resins as mentioned above, it has now been found the use of a certain thermoplastic resin composition can afford molded products which are excellent in coating property, impact strength, processability and heat resistance.

According to this invention, there is provided a thermoplastic resin composition which comprises (A) at least one of polyamide resins and polyacetal resins, (B) at least one of aromatic monovinyl compound/vinyl cyanide copolymers comprising units of aromatic monovinyl compounds and units of vinyl cyanides in a weight proportion of 60:40 to 80:20 and having an intrinsic viscosity of 0.3 to 1.1 and (C) at least one of conjugated diene rubber/aromatic monovinyl compound/vinyl cyanide graft copolymers comprising units of conjugated diene rubbers in a content of 5 to 45% by weight based on the weight of the graft copolymers in a weight proportion of the components (A), (B) and (C) being 0.1-10:5-90:5-94.9.

As the component (A), there may be used at least one of polyamide resins (e.g. Nylon 4, Nylon 6, Nylon 7, Nylon 8, Nylon 9, Nylon 11, Nylon 12, Nylon 66, Nylon 610) and polyacetal resins such as formaldehyde homopolymer (i.e. polyacetal homopolymer) or formaldehyde/ethylene oxide copolymer (i.e. polyacetal copolymer). These polyamide resins and polyacetal resins may be used alone or in combination. The amount of the component (A) may be from 0.1 to 10% by weight, preferably from 0.5 to 5% by weight, based on the total weight of the components (A), (B) and (C). When it is smaller than the lower limit, the dispersion of the component (A) is uneven, and the production of stress cracks on coating is unavoidable. When it is larger than the higher limit, the impact strength is lowered, and the delamination is produced in the molded article.

As the component (B), there may be employed at least one of copolymers of units of aromatic monovinyl compounds and units of vinyl cyanides in a weight proportion of 60:40 to 80:20, which have an intrinsic viscosity of 0.3 to 1.1. Any copolymer out of the above range is unfavorable, because the physical properties of the resulting composition are unbalanced. Examples of the aromatic monovinyl compound are styrene, α-methylstyrene, vinyltoluene, monochlorostyrene, etc. Examples of the vinyl cyanide are acrylonitrile, methacrylonitrile, etc. The intrinsic viscosity indicates the value determined in dimethylformamide at 30° C. The amount of the component (B) may be from 5 to 90% by weight, preferably from 20 to 80% by weight, based on the total weight of the components (A), (B) and (C). When it is smaller than the lower limit, the processability of the resulting composition is markedly deteriorated. When it is larger than the higher limit, the mechanical properties such as impact strength are lowered.

The component (C) is at least one of conjugated diene rubber/aromatic monovinyl compound/vinyl cyanide graft copolymers containing units of conjugated diene rubbers in a content of 5 to 45% by weight based on the weight of the graft copolymer. As the conjugated diene rubber, there may be exemplified polybutadiene, styrene/butadiene copolymer, acrylonitrile/butadiene copolymer, etc. Examples of the aromatic monovinyl compound are styrene, α-methylstyrene, vinyltoluene, monochlorostyrene, etc. Examples of the vinyl cyanide are acrylonitrile, methacrylonitrile, etc. When the content of the conjugated diene rubber is less than the lower limit, the impact resistance of the resulting composition is inferior. When more than the higher limit, the processability is deteriorated. The contents of units of the aromatic monovinyl compound and units of the vinyl cyanide are preferred to be from 30 to 78% and from 17 to 35% by weight on the basis of the weight of the graft copolymer. The amount of the component (C) may be from 5 to 94.9% by weight, preferably from 20 to 80% by weight, based on the total weight of the components (A), (B) and (C). When the amount is less than the said lower limit, the impact resistance is lowered. When the amount is more than the higher limit, the processability is deteriorated. Further, the dispersibility of the polyamide resin and/or the polyacetal resin as the component (A) becomes uneven so that not only the coating property but also the impact strength are lowered.

For mixation of the said essential components (A), (B) and (C), there may be used a conventional mixing apparatus such as Banbury mixer, Henschel mixer or an extruder. When desired, any conventional additive such as a coloring agent, a filler or a plasticizer may be incorporated into the thermoplastic resin composition.

Practical and presently preferred embodiments of this invention are illustratively shown in the following Examples wherein % and part(s) are by weight unless otherwise indicated.

EXAMPLES 1 TO 5 AND COMPARATIVE EXAMPLES 1 TO 5

As shown in Table 1, polyamide resin, a polyacetal resin, an aromatic monovinyl compound/vinyl cyanide copolymer as the component (B) and a conjugated diene rubber/aromatic monovinyl compound/vinyl cyanide graft copolymer as the component (C) were mixed together in a Banbury mixer at 180° to 200° C. for 5 minutes and injection molded at 200° C. by the use of an injection molding machine of 5 ounce to give a molded product. Using a planet PA (urethane system; manufactured by Origin Electric Co., Ltd.) and No. 210 thinner (viscosity determined by Ford Cup, 9.5 seconds), coating was effected onto the molded product. The results are also shown in Table 1.

TABLE 1

| | Example | | | | | Comparative Example | | | | |
|---|---|---|---|---|---|---|---|---|---|---|
| Example | 1 | 2 | 3 | 4 | 5 | 1 | 2 | 3 | 4 | 5 |
| Composition*[1] | | | | | | | | | | |
| 1. Component (A) | | | | | | | | | | |
| Polyamide resin | | | | | | | | | | |
| Nylon 66 | 1.5 | — | — | — | 1.5 | 12.5 | — | 1.5 | — | — |
| Nylon 610 | — | 2.5 | — | — | — | — | — | — | — | — |
| Polyacetal resin | | | | | | | | | | |
| Polyacetal homopolymer | — | — | 1.5 | — | 1.5 | — | 12.5 | — | 1.5 | — |
| Formaldehyde/ethylene oxide copolymer | — | — | — | 2.0 | — | — | — | — | — | — |
| 2. Component (B) | | | | | | | | | | |
| STY/ACN (70/30) $\eta = 0.55$ | 25 | 20 | — | 40 | 25 | — | 20 | — | 20 | 20 |
| α-STY/STY/ACN (40/30/30) $\eta = 0.80$ | — | — | 20 | — | — | 20 | — | — | — | — |
| STY/ACN (70/30) $\eta = 1.30$ | — | — | — | — | — | — | — | 25 | — | — |
| 3. Component (C) | | | | | | | | | | |
| PBDE/STY/ACN (20/50/30) | 75 | — | 80 | 60 | 75 | 80 | 80 | 75 | — | 80 |
| NBR/STY/ACN (25/50/25) | — | 80 | — | — | — | — | — | — | — | — |
| PBDE/STY/ACN (3/72/25) | — | — | — | — | — | — | — | — | 75 | — |
| Physical properties | | | | | | | | | | |
| Coating property (stress cracking) | None | None | None | None | None | None | None | Ob-*[2] served | Ob-*[2] served | Ob-*[3] served |
| Processability (cm³/min) (210° C., 30 kg/cm²) | 0.08 | 0.04 | 0.07 | 0.03 | 0.07 | 0.02 | 0.03 | 0.007 | 0.006 | 0.04 |
| Heat deformation temperature (°C.) (264 psi, 85° C., 2 hrs annealing) | 96.5 | 98.0 | 96.0 | 98.0 | 96.5 | 96.7 | 97.0 | 96.0 | 95.5 | 96.5 |
| Izod impact strength (kg . cm/cm²) (notched, ¼", 23° C.) | 26.5 | 28.0 | 28.0 | 28.5 | 28.0 | 2.5 | 3.0 | 29.0 | 31.0 | 30.0 |

Note:
*[1]STY, styrene; α-STY, α-methylstyrene; ACN, acrylonitrile; PBDE, polybutadiene; NBR, acrylonitrile/butadiene copolymer.
*[2]Stress cracks observed at the part where a flowmark was produced.
*[3]More remarkable stress cracks than those in Comparative Examples 3 and 4.

What is claimed is:

1. A thermoplastic resin composition consisting essentially of (A) at least one of polyamide resins and polyacetal resins, (B) at least one of aromatic monovinyl compound/vinyl cyanide copolymers comprising units of aromatic monovinyl compounds and units of vinyl cyanides in a weight ratio of 60:40 to 80:20 and having an intrinsic viscosity of 0.3 to 1.1 and (C) at least one of conjugated diene rubber/vinyl cyanide graft copolymers comprising units of conjugated diene rubbers in an amount of 5 to 45% by weight based on the weight of the graft copolymers in a weight proportion of the components (A), (B) and (C) being respectively 0.1-10-:5-90:5-94.9.

* * * * *